(12) United States Patent
Williams

(10) Patent No.: US 8,177,258 B2
(45) Date of Patent: May 15, 2012

(54) TRAILER SYSTEM

(76) Inventor: Marty Williams, Colorado Springs, CO (US)

( * ) Notice: Subject to any disclaimer, the term of this patent is extended or adjusted under 35 U.S.C. 154(b) by 50 days.

(21) Appl. No.: 11/549,651

(22) Filed: Oct. 15, 2006

(65) Prior Publication Data

US 2011/0272918 A1   Nov. 10, 2011

(51) Int. Cl.
   *B62D 63/06*   (2006.01)
(52) U.S. Cl. ........................................... 280/789
(58) Field of Classification Search ................. 280/789, 280/797, 798; 296/182.1, 183.1, 184.1
   See application file for complete search history.

(56) References Cited

U.S. PATENT DOCUMENTS

| 2,986,401 | A | * | 5/1961 | Altadonna | 280/652 |
| 4,126,324 | A | * | 11/1978 | Browning | 280/42 |
| 4,582,333 | A | * | 4/1986 | Doering | 280/63 |
| 4,671,530 | A | * | 6/1987 | van der Wouden | 280/656 |
| 6,378,893 | B1 | * | 4/2002 | Jager | 280/656 |
| 7,708,299 | B2 | * | 5/2010 | Duval et al. | 280/401 |
| 2010/0059950 | A1 | * | 3/2010 | Coghill, Jr. | 280/47.26 |

* cited by examiner

*Primary Examiner* — Faye M. Fleming
(74) *Attorney, Agent, or Firm* — APEX Juris, PLLC; Tracy M. Heims

(57) ABSTRACT

A trailer system that is quickly and easily assembled and disassembled. The trailer components can be shipped and stored in a knockdown configuration and then quickly assembled with single wrench and little mechanical skill. A plurality of structural members are bolted onto a beam set to form the trailer bed. A simple trailer axle and wheel assembled can then be attached to the trailer bed. The shipping container is used to form the surfaces of the trailer.

9 Claims, 8 Drawing Sheets

TRAILER SYSTEM

FIELD OF THE INVENTION

This invention relates to the field of utility trailers and more particularly to the field of collapsible utility trailers.

BACKGROUND OF THE INVENTION

Utility trailers and other types of trailer are typically formed with a bed assembly attached onto a wheel assembly having leaf or coil springs. These trailers are normally assembled by the manufacturer and shipped to the distribution site. Since even small trailers are relatively cumbersome to ship as well as to display, the cost of shipping becomes a substantial expense. Additionally, the space necessary to display and inventory these trailers creates additional expense added to the cost of the trailers.

Another problem with trailers is the storage space by the owner. Often, there simply is not adequate space for a homeowner to store the trailer at their residence. Even if there is space, the trailers are relatively unsightly and many homeowner associations forbid their storage outside of residences. Most homeowners do not have the garage space necessary to store the trailer inside.

There have been attempts to solve these problems in the past. One attempt has been to provide trailers that fold in order to reduce their storage space. These trailers typically have a flat bed that is hinged to fold together. The axle assemblies may include the capability to slide together to further reduce the space. However, these systems still require substantial space, and their structural integrity is suspect.

Another attempt to solve these problems is to provide a knock down trailer. These systems enable an individual to disassemble the trailer for shipment and for storage. However, these trailers require substantial mechanical skill, tools and parts for assembly and disassembly.

Thus a need exists for a trailer system that is relatively compact when disassembled, that can server multiple purposes and that can be easily and quickly assembled without the need for substantial mechanical skill.

SUMMARY OF THE INVENTION

The present invention solves these and other needs by providing a trailer system that can be easily assembled and disassembled. The trailer system can be shipped in a knock down configuration for reduced expense and inventory space. The user can then easily assemble the trailer with a single wrench. The trailer can be just as easily disassembled when not needed for space savings.

The trailer system of a preferred embodiment is assembled from a packaged set of components. In one preferred embodiment, the trailer components form the shipping crate that the axle and wheel set are shipped in. Also, the trailer components may be reused from a shipping crate that is used for other items. The additional components may be purchased as a kit.

The trailer system of another preferred embodiment is assembled from a packaged set of components provided in a shipping container. The panels of the shipping package are used to form the surfaces of the assembled trailer.

The trailer system of the preferred embodiment are formed from relatively lightweight yet high strength components. This reduces the shipping weight as well as increasing the usability of the trailer.

The trailer system can include additional components, such as side and bottom panels to create an enclosed trailer bed. Also, a top may be added as well as a tailgate and front wall if desired. The user may also construct these additional components from common building materials.

The trailer system in a preferred embodiment includes two spaced structural beams having a plurality of spaced holes. These beams are formed of hollow tubing or other materials. The structural members are formed in a U shape from structural hollow tubing. These members have holes formed therein to match up with the holes in the beams. A plurality of U shaped structural members are fastened to the beams spaced from one another to form the base trailer bed. The axle system is attached to the lower side of the beams. An open slotted channel cross member is attached to the upper ends of the structural member and extending the length of the trailer bed. This adds structural rigidity as well providing a mechanism for attaching a top or other equipment to the trailer bed.

These and other features of the present invention will be evident from the ensuring detailed description of preferred embodiments and from the drawings.

DETAILED DESCRIPTION OF PREFERRED EMBODIMENTS

The present invention, in a preferred embodiment, provides an improved trailer system that can be shipped and stored in a compact form as well as assembled quickly and easily into a structurally strong trailer. A preferred embodiment of the present invention is described below. It is to be expressly understood that this descriptive embodiment is provided for explanatory purposes only, and is not meant to unduly limit the scope of the present invention as set forth in the claims. Other embodiments of the present invention are considered to be within the scope of the claimed inventions, including not only those embodiments that would be within the scope of one skilled in the art, but also as encompassed in technology developed in the future.

A preferred embodiment of an improved trailer system of the present invention is illustrated in FIGS. 1-5. This preferred embodiment is described for use as a utility trailer but it is expressly noted that other uses may be included with the present invention. Also, the trailer system of the present invention may also be scaled down or up in size as desired.

Figure 1:
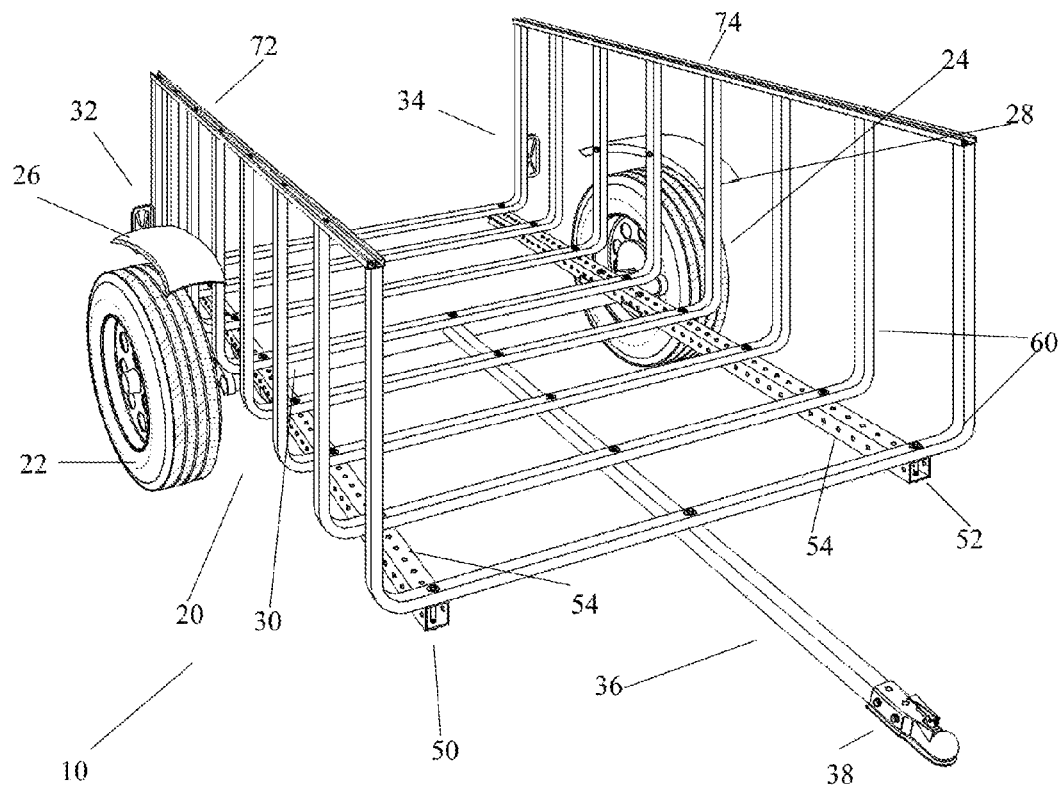
FIG. 1 is a perspective view of the basic trailer system of a preferred embodiment of the present invention.
Figure 2:
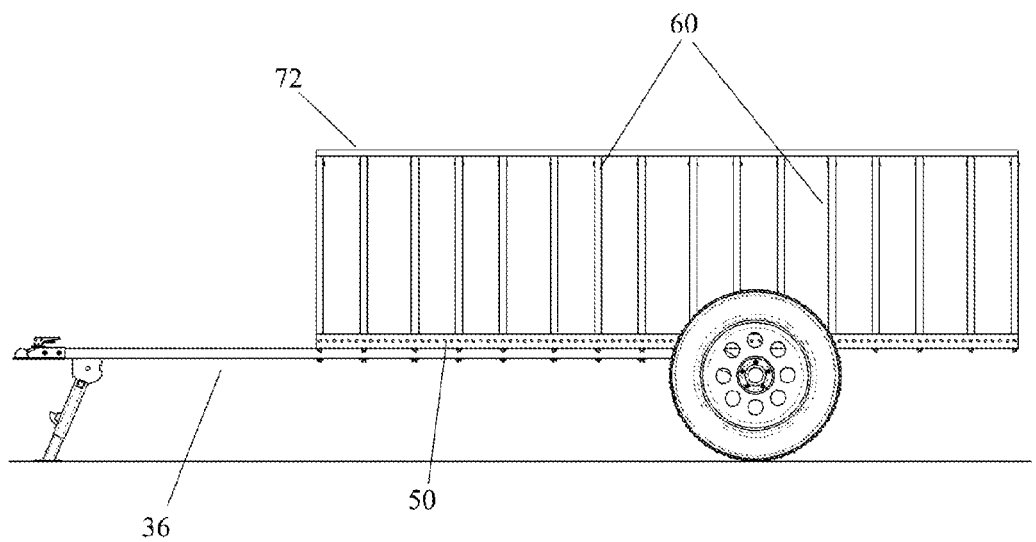
FIG. 2 is side view of the trailer system of FIG. 1.
Figure 3:
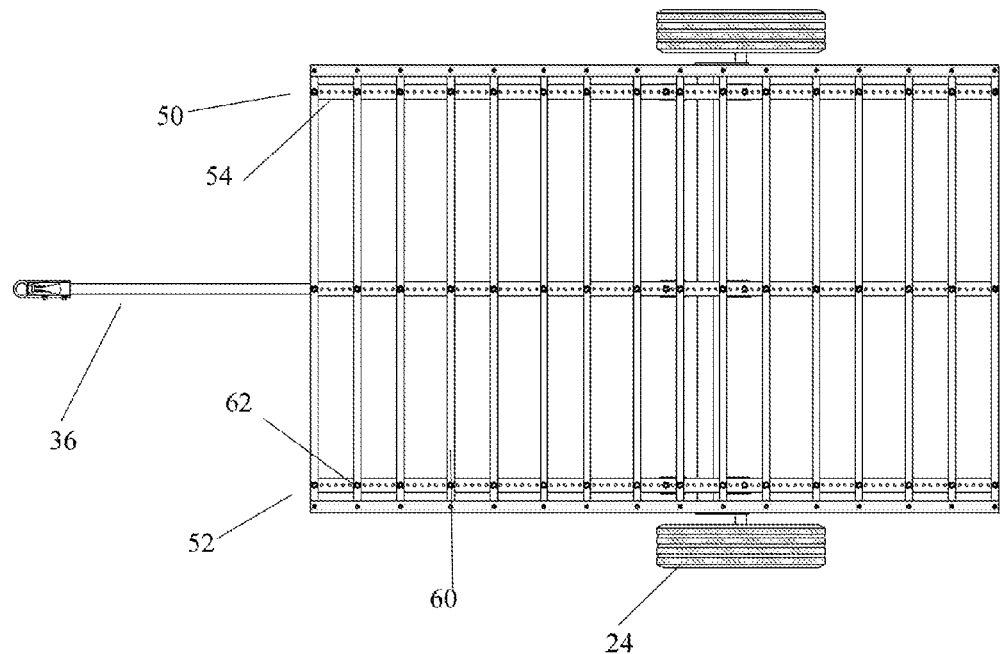
FIG. 3 is a top view of the trailer system of FIG. 1.

Trailer system 10, as shown in FIGS. 1-3, includes an axle system 20 having wheels 22, 24, fenders 26, 28, and axle 30. The axle system 20 is formed from standard components, and are of standard sizes and strengths for the trailer system being utilized. The wheels 22, 24 are typically removed for shipping purposes. Fenders 26, 28 are also mounted to the trailer frame as discussed above. Taillights 32, 34 are also attached to the trailer and include a standard wiring harness. Trailer tongue 36 and hitch 38 are also attached to the trailer.

The bed of the trailer system 40 is formed from a unique design. In a preferred embodiment of the present invention, the trailer bed system is formed from structural tubing. The structural tubing can be hollow lightweight high strength steel tubing, such as one-half to one-inch tubing. Other sizes can be used as well as other material choices, particularly if different weight and size capacities are desired.

The trailer bed system of a preferred embodiment may also incorporate beams, slats, open slot C channel members or other elongated members. This provides a high strength support structure to reinforce the structural tubes as well as to maintain the structural tubing in the desired spaced relationship to one another. The open slot C channel members also allow the fastening mechanisms for securing the structural tubes to the beams to be easily adjusted to the appropriate locations. In one preferred embodiment, the fastening mechanisms include spring nuts that are easily inserted into the channel members.

In the trailer bed system of the preferred embodiment, two parallel beams 50, 52 that are formed of square tubes form the base structure of the bed system. Each of the beams 50, 52 include a plurality of spaced holes 54 extending along the length of the beams. It is to be expressly understood that while the beams 50, 52 are described as hollow square structural tubes, these beams could be solid, aluminum, structural plastic, wood, channel iron, or even open slotted C channel members. It is also to be understood that the number of beams may be changed as well. The beams extend the length of the trailer bed 40. A plurality of hollow structural members 60 are secured onto the two parallel beams 50, 52. The hollow structural members 60 in the preferred embodiment are U shaped structural tubing. It is to be expressly understood that these members could also be formed from solid material, structural plastic, wood, channel members or other types of materials. In this preferred embodiment, sixteen structural members are used, but it is to be expressly understood that other numbers of structural members may be used depending on the capacity and size of trailer desired.

Figure 4:
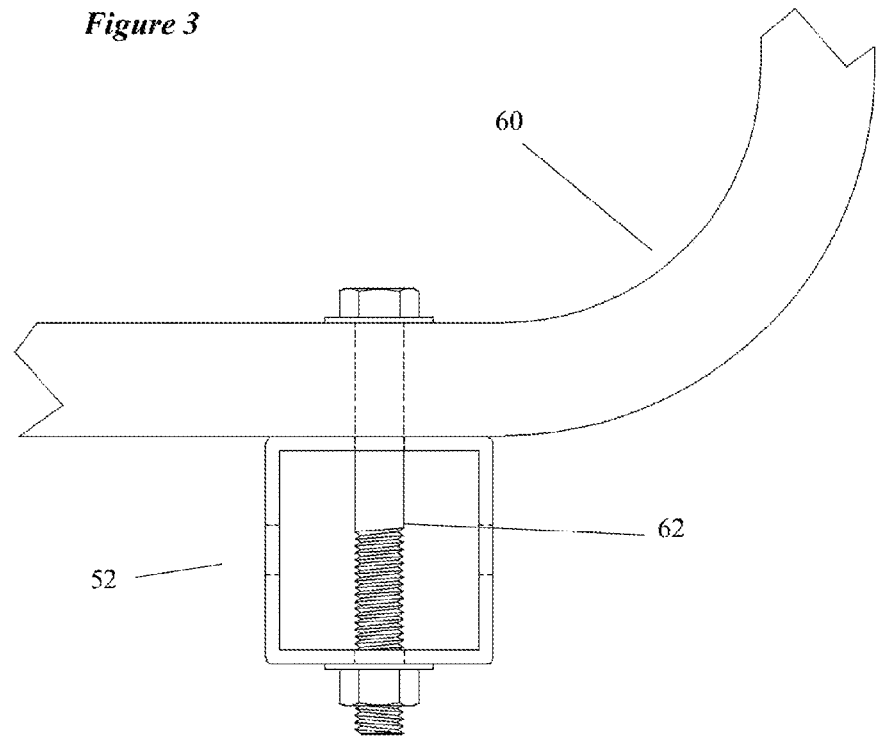
FIG. 4 is a detail view of the fastening system of the structural members and beams of the trailer system of FIG. 1.

The structural members 60 are secured by fasteners, such as bolts 62, as shown in FIG. 4 that extend through the structural member 60 and through holes 54 of beams 50, 52. The structural members 60 are secured to the beams 50, 52 in spaced relationship to one another as shown in FIGS. 1-4.

Figure 5:
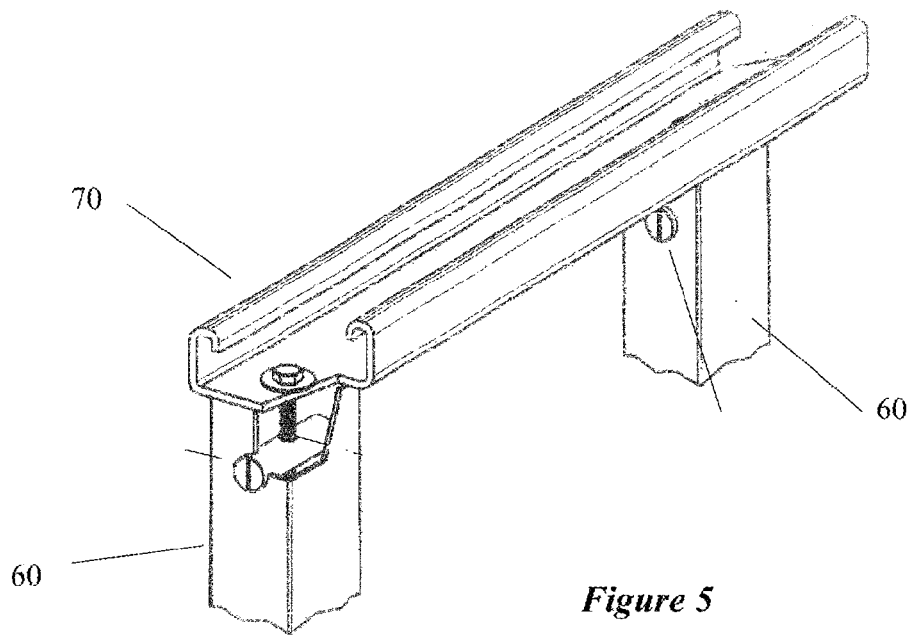
FIG. 5 is a detail view of the cross member fastening system of the trailer system of FIG. 1.
Figure 6:
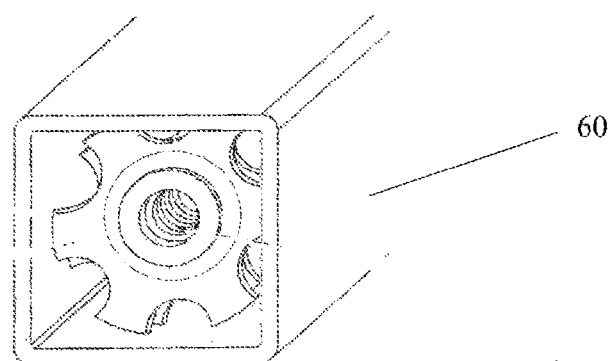
FIG. 6 is a detail view of an alternative fastening system for the cross members.
Figure 7:
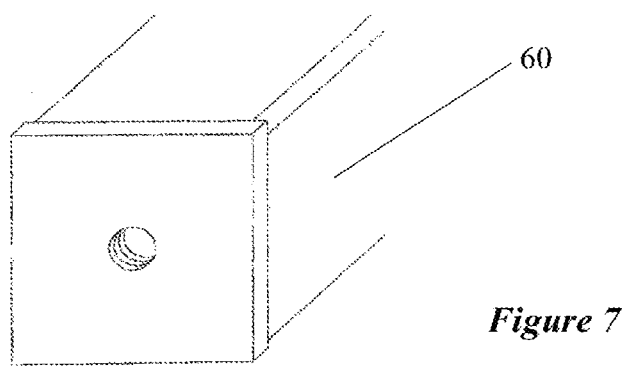
FIG. 7 is a detail view of another alternative fastening system for the cross members.

Upper cross members 70, 72 are secured to the upper end of the structural members 60 to provide additional rigidity and strength to the trailer bed 40. In this preferred embodiment, the upper cross members are formed from open slotted C channel members. These members are secured to the upper end of the members 60 by dowel pins, as shown in FIG. 5, by spring loaded star nuts as shown in FIG. 6 or simply by welding nuts to the upper ends as shown in FIG. 7.

The assembled trailer bed is secured to the axle 20 by bolting the axle to the underside of beams 50, 52. The wheels are attached to the axle while the fenders 26, 28 are secured to the adjacent structural members by screws. The trailer tongue is attached to the center bottom portion of the structural members 60 with the hitch attached. The taillights 32, 34 are also attached to the rear structural member.

Figure 8:
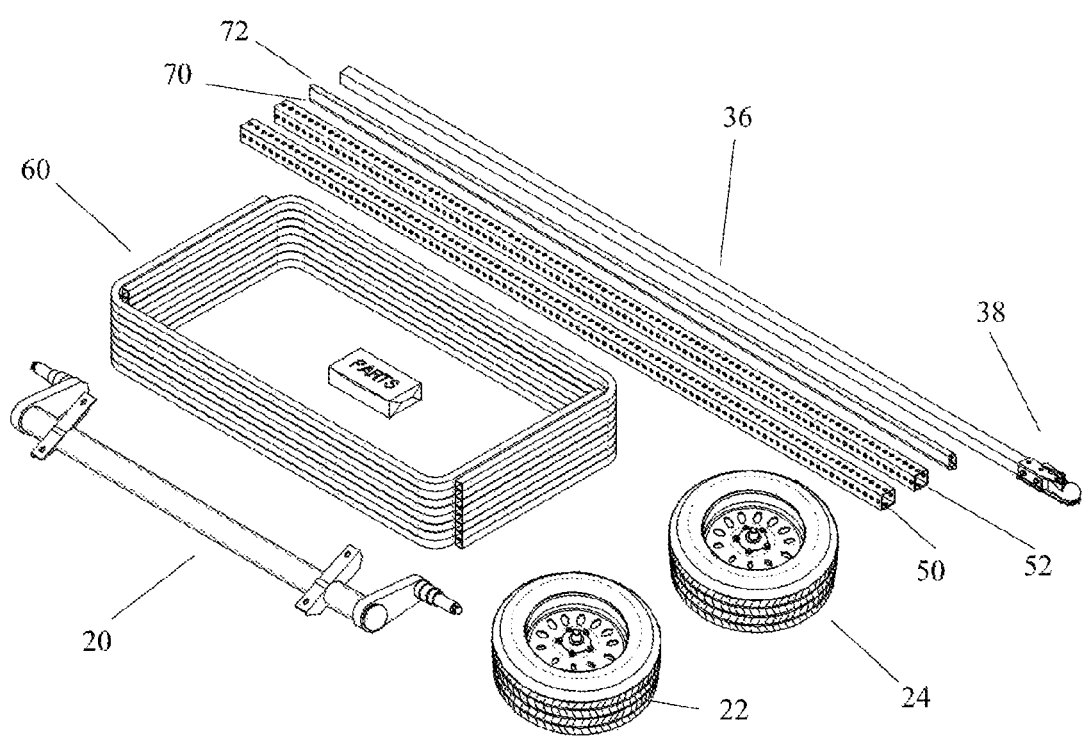
FIG. 8 is a perspective view of the knock down components of the disassembled trailer system of FIG. 1.

The basic trailer is thus assembled from the components shown in FIG. 8. These components are easily shipped knock-down for inexpensive shipping as well as inventory. Also, if the trailer is not needed for a period of time, it is easily disassembled for storage. The entire trailer can be assembled with single wrench and screwdriver. There is little mechanical skill that is necessary for the assembly and disassembly of the trailer.

The trailer may also be converted from a crate system as well. For example, the crate system described in co-pending patent application Ser. No. 10/711,961, filed on Oct. 15, 2004, incorporated herein by reference, is formed from the structural members 60, cross members 70, 72 and beams 50, 52. These components may be reused to create the trailer as described above. All that it necessary to complete the trailer are the wheels, axle, taillights, hitch and tongue. These components may be provided as a kit to be sold separately.

While the basic trailer is assembled as described above, additional components may be added to provide even more utility. For example, solid panels from wood, plastic or other materials may be provided to enclose the trailer. A tailgate and/or front panel may be provided to secure cargo within the trailer. Also, equipment mounting components, such as bicycle mounting hardware, motorcycle mounting hardware, cargo hooks, or other equipment mounting hardware may be affixed to appropriate locations within the trailer as well.

The open slotted C channel cross members 70, 72 may also include equipment mounting hardware secured by spring nuts as described in U.S. Pat. No. 6,213,539, issued on Apr. 10, 2001 and incorporated herein by reference. The C channel construction also makes it easy to install a hard or soft top onto the trailer. The trailer may also be converted into a camping tent trailer, such as described in co-pending patent application Ser. No. 10/904,282, filed on Nov. 2, 2004 and incorporated herein by reference.

Alternative Kit Embodiment

Figure 9:
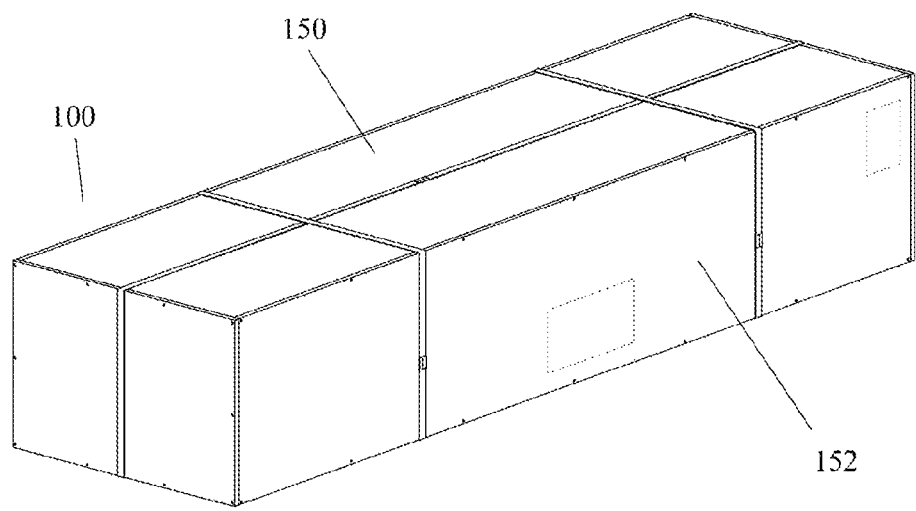
FIG. 9 is a perspective view of the shipping container for a kit version of the present invention.
Figure 10:
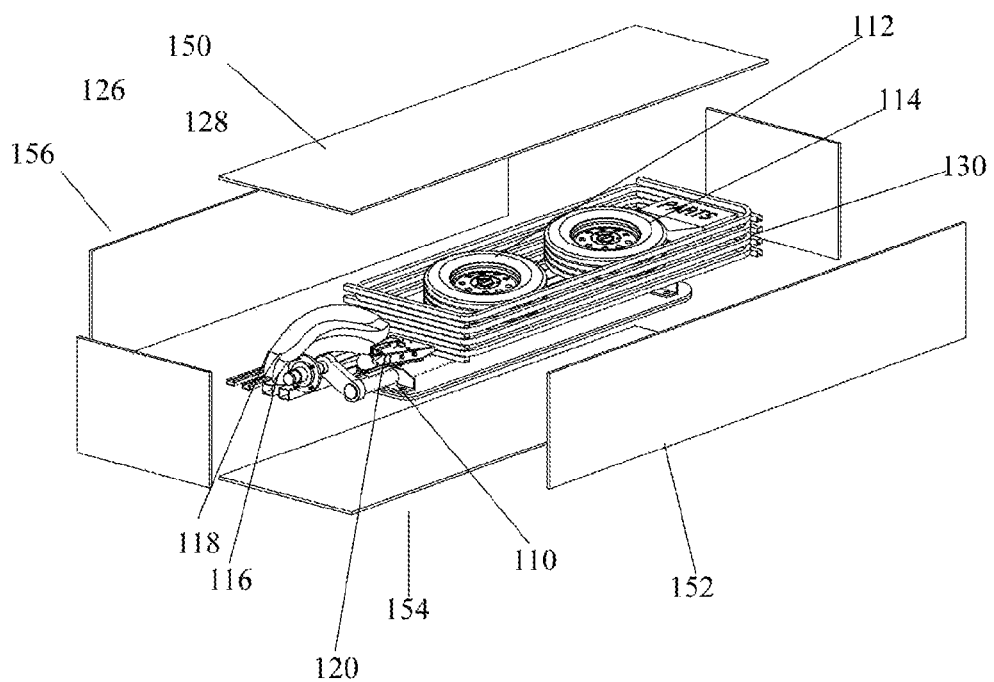
FIG. 10 is a perspective view of the shipping container partly disassembled.
Figure 11:
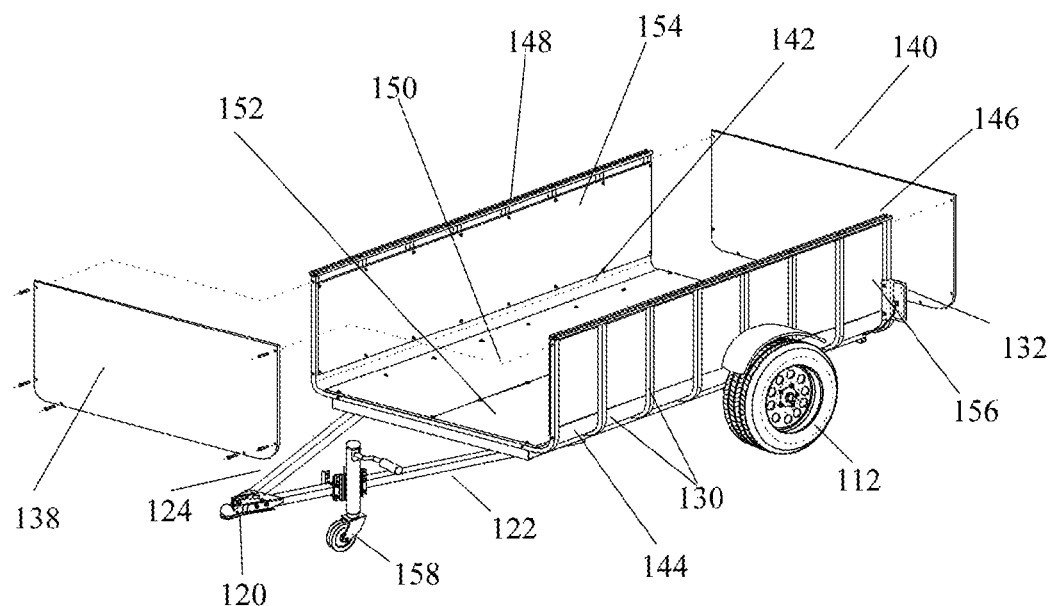
FIG. 11 is a perspective view of the partly assembled trailer.

An alternative embodiment is illustrated in FIGS. 9-11. This embodiment provides an easily assembled trailer provided in a shipping package that is 20 inches by 24 inches by 84 inches as shown in FIG. 9. This compact package allows four packages to be shipped on a standard pallet and eighty packages to be shipped in a standard forty foot container. Also, this allows a distributor to maintain substantial inventory without using valuable floor or storage space. The trailer of this preferred embodiment of the present invention may be assembled in short time with a wrench and screwdriver by individuals with no expertise. The packaging also forms part of the trailer as well so there is little waste after the trailer has been assembled.

In this embodiment, the trailer is shipped in the shipping package 100 shown in FIGS. 9 and 10. Once the shipping package has reached its destination, the package is disassembled as shown in FIG. 10. The contents of the package 100 include axle/wheel assembly 110, wheels 112, 114, fenders 116, 118, trailer tongue 120, trailer tongue members 122, 124, support beams 126, 128, curved structural members 130, trailer lights 132, 134, license plate bracket 136, front panel 138, rear panel 140, curved flashing members 142, 144, cross members 146, 148 and other miscellaneous parts described in greater detail below. These components are similar to the comparable components described in the embodiments discussed above. The side panels 150, 152, 154, 156 of the shipping package 100 also are used as components in the trailer as well as discussed in greater detail below. The side panels can be formed from structural plywood that can be unpainted, painted, powder coated or otherwise treated. The panels may also be formed of plastic, metal or any other type of structural material.

The components are assembled as discussed in the embodiments described above. The wheels 112, 114 and fenders 116, 118 are mounted to the axle/wheel assembly 110. The two support beams 126, 128 are also secured to the axle/wheel assembly 110 by bolts and nuts through holes formed in the support beams 126, 128. The trailer tongue members 122, 124 are secured to the front of the support beams 126, 128 forming a V shape onto which the tongue 120 are mounted. A trailer jack 158 is attached to the trailer tongue member 122 to raise and lower the trailer tongue.

The curved structural members 130 are mounted onto the support beams 126, 128. The curved structural members 130 are spaced apart and mounted so the curved portions extend upwardly. The structural members 130 are mounted to the support beams 126, 128 by nuts and bolts similar to the embodiment illustrated in FIG. 4, by dowel pins similar to the dowel pin arrangement disclosed in FIG. 5 or by other fastening mechanisms. Cross members 146, 148 are fastened onto the upper ends of the structural members by dowel pins, similar to those illustrated in FIG. 4, bolts, or other fastening mechanisms. In a preferred embodiment, the cross members have a C channel shape with a slot extending into the channel. The slot has a lesser width than the cross-section of the channel.

The tail lights 132, 134 and license plate bracket 136 are attached to the rear structural member 130. A wiring harness (not shown) is connected to the trailer tail lights 132, 134 and is secured beneath the trailer body to extend to the trailer tongue.

The shipping package side panels 150, 152 are secured to the lower portions of the structural members 130 to form the bottom surface of the trailer compartment. The shipping package side panels 154, 156 are secured to the upwardly extending portions of the structural members 130 to form the side surfaces of the trailer compartment. The curved flashing components 144, 146 are attached to the panels 150, 154 and 152, 156 respectively to form the corners of the trailer compartment. The panels are attached to the structural members 130 by bolts, screws or any other fastening mechanisms.

Figure 12:
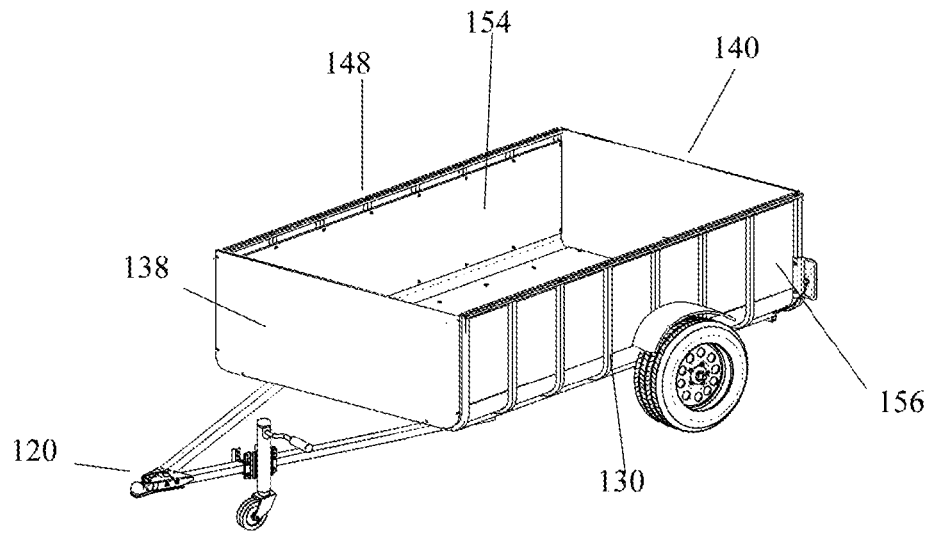
FIG. 12 is a perspective view of the assembled trailer.

Front panel 138 is secured to the front structural member 130 by bolts or screws in this embodiment. The rear panel 140 is also attached to the rear structural member 130 as shown in FIGS. 11 and 12. The assembled trailer is sturdy utility trailer that is easily assembled.

Figure 13:
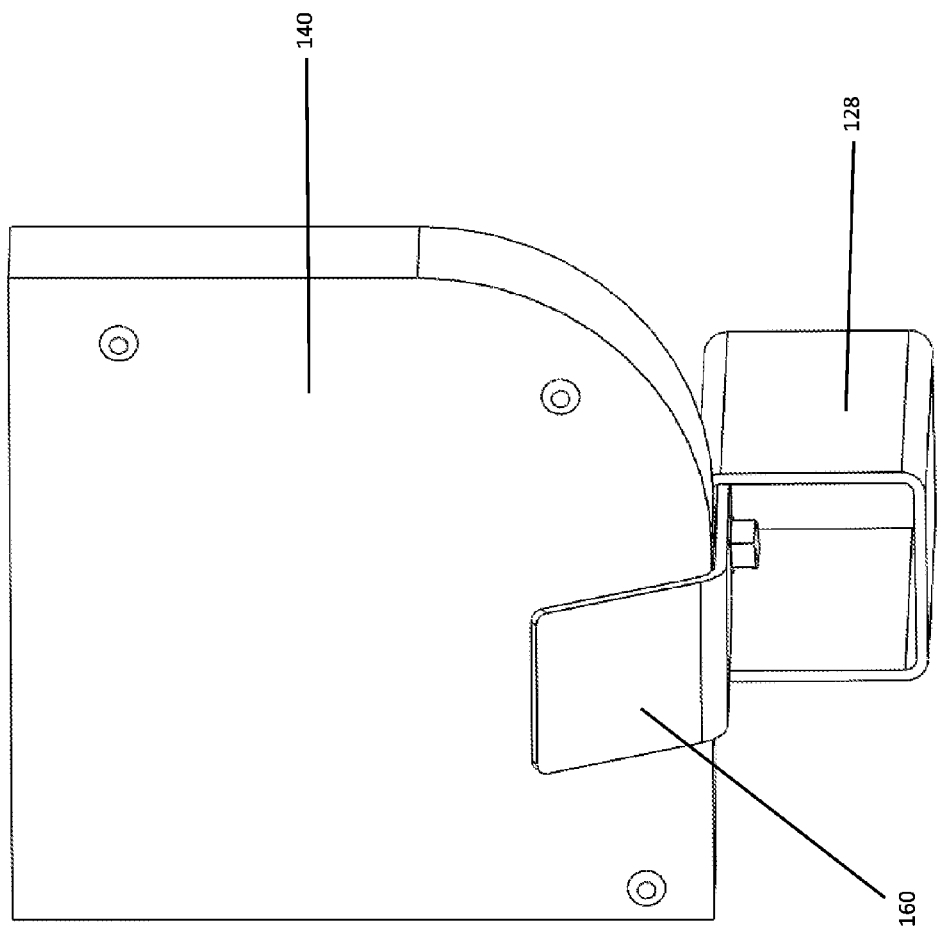
FIG. 13 is a sectional view of the bottom bracket for securing the front and rear panels.
Figure 14:
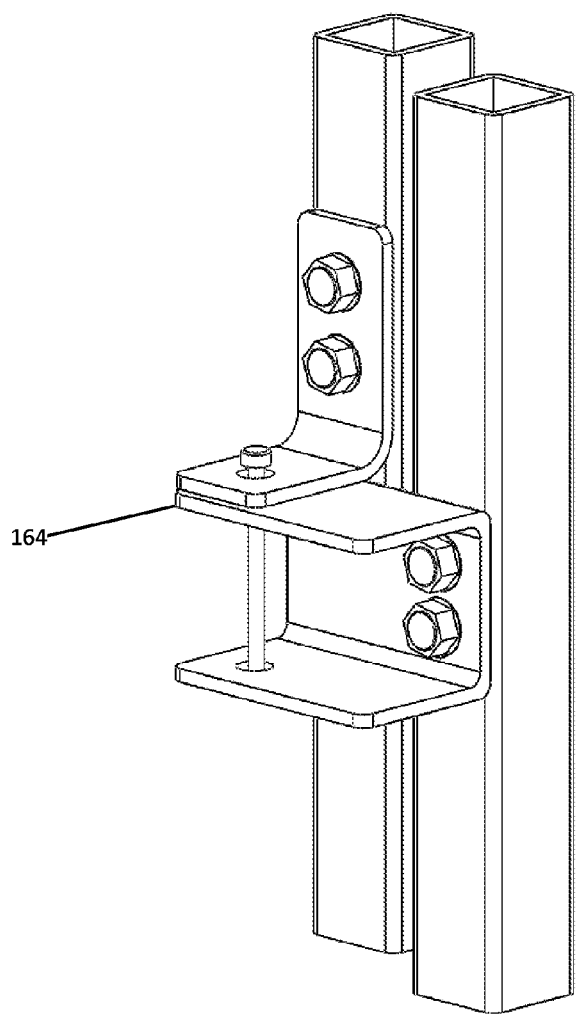
FIG. 14 is a sectional view of the securement bracket for the front and rear panels.

In another preferred embodiment, the trailer includes bottom brackets 160 attached to each end of the support beams 126, 128 as shown in FIG. 13. The front and rear panels are then inserted into the bottom brackets for ease of attachment to the trailer. Side brackets 164, shown in FIG. 14, align on the upper portion of the front and rear panels to allow the panels to be secured to the trailer body.

It is to be expressly understood that the above described embodiments are intended for explanatory purposes only and are not meant to limit the claimed inventions.

What is claimed is:

1. A trailer system wherein said trailer system comprises:
    a shipping container having side panels;
    at least one support beam;
    a plurality of holes formed in a spaced relationship to one another in said at least one support beam;
    a plurality of structural members;
    fasteners for securing each of said plurality of structural members to said at least one support beam;
    an axle system securable to said at least one support beam;
    wheels fastenable to said axle system; and
    where said shipping container side panels are securable to said structural members to form trailer surfaces.

2. The trailer system of claim 1 wherein said plurality of structural members include:
    U-shaped structural members forming a trailer bed having a bottom portion and side walls.

3. The trailer system of claim 1 wherein said at least one support beam includes:
    two support beams spaced parallel to one another with a plurality of spaced holes formed in each of said two support beams.

4. The trailer system of claim 1 wherein each of said at least one support beam includes:
    a hollow square support beam.

5. The trailer system of claim 1 wherein each of said plurality of structural members include:
    hollow square tubing.

6. The trailer system of claim 1 wherein said trailer system includes:
    at least one cross member secured to at least one end of said structural members.

7. The trailer system of claim 1 wherein said trailer system includes:
    said at least one support beam, said plurality of structural members, said axle system and said wheels provided in said shipping container for ease of storage and shipment.

8. The trailer system of claim 1 wherein said trailer system includes:
    equipment mounting hardware attachable to said structural members.

9. The trailer system of claim 1 wherein said trailer system where:
    said at least one support beam and said structural components and said fasteners are previously assembled to form a shipping crate.

* * * * *